United States Patent [19]

Larsson

[11] 4,212,570
[45] Jul. 15, 1980

[54] DRILLING AND ROUTING MACHINE FOR PRINTED CIRCUIT BOARDS

[75] Inventor: Bert G. K. Larsson, Tyresö, Sweden

[73] Assignee: Svenska Inhalator AB, Johanneshov, Sweden

[21] Appl. No.: 946,857

[22] Filed: Sep. 27, 1978

[30] Foreign Application Priority Data

Sep. 27, 1977 [SE] Sweden .................................. 7710817

[51] Int. Cl.$^2$ ............................................. B23B 47/00
[52] U.S. Cl. ........................................ 408/95; 409/225
[58] Field of Search .................... 408/95, 96, 97, 98, 408/51, 88, 103, 234; 90/11 R, 15 R, 14, 58 R, DIG. 16

[56] References Cited

U.S. PATENT DOCUMENTS

| | | | |
|---|---|---|---|
| 1,265,696 | 5/1918 | Morton | 269/304 |
| 1,274,617 | 8/1918 | Smiley | 83/388 |
| 2,623,440 | 12/1952 | Nipken | 269/93 |
| 3,587,391 | 6/1971 | Pitts et al. | 90/11 R |
| 3,730,634 | 5/1973 | Gerber et al. | 408/88 |
| 4,013,282 | 3/1977 | Kaufmann et al. | 269/289 MR |

Primary Examiner—Gil Weidenfeld
Attorney, Agent, or Firm—Haseltine, Lake & Waters

[57] ABSTRACT

A machine for drilling and routing of printed circuit boards comprises a support mechanism for supporting a stack of superimposed boards in a support plane and for moving the stack of boards in a first predetermined direction parallel to the support plane. A tool spindle is disposed above the stack of boards and is movable in a second direction parallel to the support plane and perpendicular to the first direction, so that the positions of the holes to be drilled in the PC-boards can be determined in a coordinate system having the first and second directions as its X-axis and Y-axis respectively. For holding the stack of PC-boards pressed together during the drilling or routing operation, the machine comprises press rollers, which exert a pressure force upon the stack of PC-boards towards the support mechanism. The press rollers are arranged on both sides of the tool spindle with their axes of rotation parallel to the direction in which the tool spindle can be moved, i.e. the Y-direction.

5 Claims, 7 Drawing Figures

DRILLING AND ROUTING MACHINE FOR PRINTED CIRCUIT BOARDS

FIELD OF THE INVENTION

The present invention relates in general to a machine for drilling and routing of printed circuit boards, generally called PC-boards, and concerns in particular an arrangement for holding the boards during the processing operations in such a machine.

PRIOR ART

When drilling PC-boards, the common practice is to arrange a plurality of boards in a stack of superimposed boards and to drill all boards in the stack at the same time. During the drilling operation, it is then necessary to press the boards in the stack together so that the risk of burrs between the boards is minimized and so that the boards are kept in a fixed position and prevented from moving in the vertical direction. In this way the vertical feed motion of the drill spindle can be minimized.

The most widely used manner of pressing the boards together and keeping them in a fixed position during the tooling operation is by means of a so called pressure foot. This is usually arranged concentrically to the drill spindle and pressed downwards against the stack of PC-boards before each separate drilling operation. After the drilling of one hole, the pressure foot is lifted and lowered again against the PC-boards at the position of the next hole to be drilled. This vertical movement of the pressure foot is usually produced by expanding the vertical movement of the drill spindle.

The PC-boards are usually fixed to the coordinate table of the drilling machine by pinning. For moving or indexing the boards and the drill spindle relative to each other in the X- and Y-directions of the coordinate system there are mainly two methods that can be used. In the first method, the drill spindle is stationary and the machine table with the PC-boards is movable in the X-direction as well as the Y-direction. In the second method the machine table with the PC-boards is movable only in a single direction, the X-direction, and the drill spindle is movable in the second direction, the Y-direction. This second method is called the "split-axis" method.

SUMMARY OF THE INVENTION

A primary object of the present invention is to provide a drilling and routing machine for printed circuit boards operating according to the above mentioned split-axis method, which machine is improved with respect to the means for keeping the boards in a fixed position and preventing them from moving in the vertical direction during the drilling operations.

For this object, the invention provides a machine for drilling and routing of printed circuit boards, comprising means for holding and supporting a stack of superimposed boards in a predetermined support plane and for moving said stack of boards in a first direction parallel to said support plane, a tool spindle disposed above said support plane and perpendicular to said first direction independently of said movement of said boards in said first direction, and means for exerting a pressure force upon said boards towards said support means in a direction substantially perpendicular to said support plane, said pressure exerting means comprising at least one roller-shaped pressing member rotatable about an axis parallel to said second direction in which said tool spindle is movable.

The pressure exerting means comprises preferably a plurality of rollers disposed in rows on both sides of the tool spindle. Between these rows the tool spindle will be free to move horizontally, in the Y-direction, and also vertically, in the Z-direction, without being obstructed by said rollers. The PC-boards can be maintained pressed together during the entire drilling process, i.e. the pressure force is applied on the PC-boards before the drilling of the first hole and is maintained until the last hole has been drilled.

The advantages achieved with the invention are several. Thus, as compared with the pressure foot system, considerable time is saved in that the vertical movements of the pressure foot at each drilling operation, i.e. at each stroke of the drill spindle, are eliminated. This is a very important improvement in a machine of this type and makes it possible to increase the production capacity considerably. Another great advantage resides in that the pressing force applied on the PC-boards can be maintained continuously without interruptions for the entire drilling process, whereby the vibrations of the PC-boards are reduced, the drilling operation of each hole can be started sooner after the completion of the drilling of the foregoing hole and an improved quality of the holes is obtained.

BRIEF DESCRIPTION OF THE FIGURES OF THE DRAWING

In the following the invention will be described in more detail in connection with the accompanying drawings, which show by way of example a number of embodiments of the invention. In the drawings

DETAILED DESCRIPTION

Figure 1:
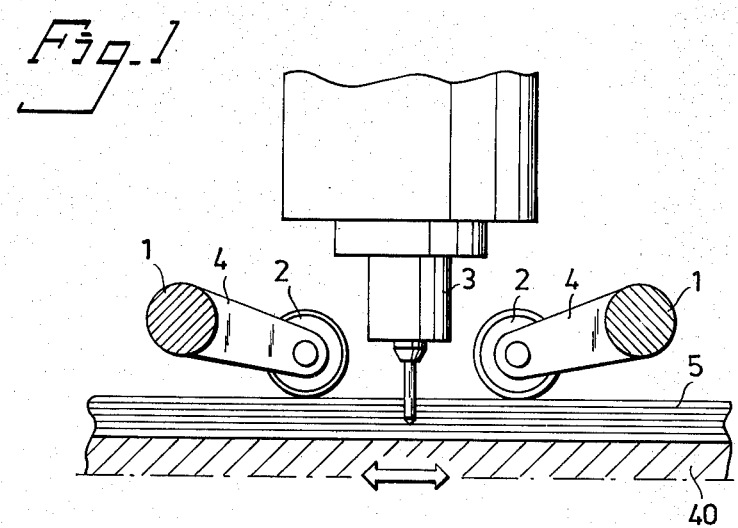
FIG. 1 is a schematic sideview of a PC-board drilling machine embodying the principle of the invention.

The basic principle of the PC-board drilling and routing machine according to the invention is illustrated in FIG. 1. The machine comprises a support table 40 for supporting a stack 5 of superimposed PC-boards to be drilled or routed. The support table 40 can be moved in one direction, as indicated by an arrow, parallel to its plane. This direction can be called the X-direction or -axis of the coordinate system in which the positions of the holes to be drilled in the PC-boards are determined. The machine comprises also a tool spindle 3, in the illustrated case a drill spindle, which can be moved relative to the table 40 and the stack 5 of PC-boards in a direction perpendicular to the plane of the drawing, i.e. in the Y-direction or Y-axis of the coordinate system. The tool spindle 3 can of course also be moved up and down in vertical direction, or the Z-direction, perpendicularly to the plane of the PC-boards 5 as required for the drilling operation. For holding the stack 5 of PC-boards pressed together during the drilling process, the machine is provided with pressure exerting means, which in the illustrated embodiment comprises a plurality of rollers 2 individually mounted for rotation in the outer ends of arms 4 projecting from horizontal shafts 1, disposed on opposite sides of the drill spindle 3 so as to be parallel to the Y-direction in which the drill spindle 3 can be moved. The axes of rotation of the press rollers 2 are also parallel to said Y-direction. The press rollers 2 are resiliantly pressed against the stack 5 of PC-boards by suitable means not illustrated in the drawing. The rollers 2 can be lowered and raised respectively at the beginning and the end of the drilling process either by rotation of the shafts 1 or by displacing these shafts in the vertical direction. It is appreciated that during the entire drilling process, the stack 5 of PC-boards can be pressed and kept together in vertical direction by means of a well-defined and uninterrupted pressure force exerted by the press rollers 2 on each side of the drill spindle 3.

The necessary compensation for different numbers of boards in the stack 5 can be made by rotating the shafts 1 or by displacing them in vertical direction or, alternatively, by lowering and raising the support table 40.

Figure 2A:
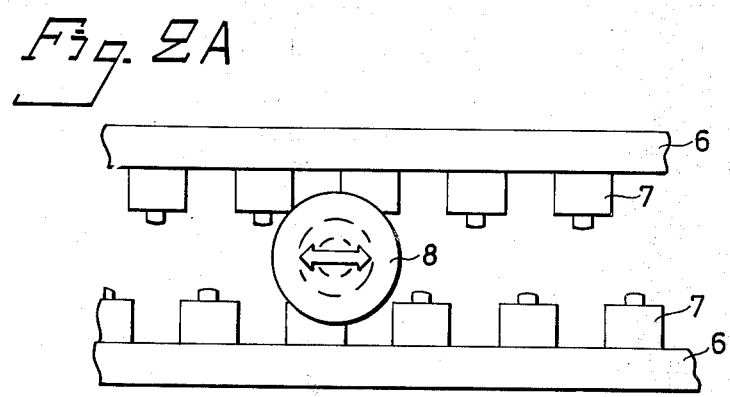
FIG. 2A shows schematically a top view of a drilling machine according to one embodiment of the invention.
Figures 2B, 2C:
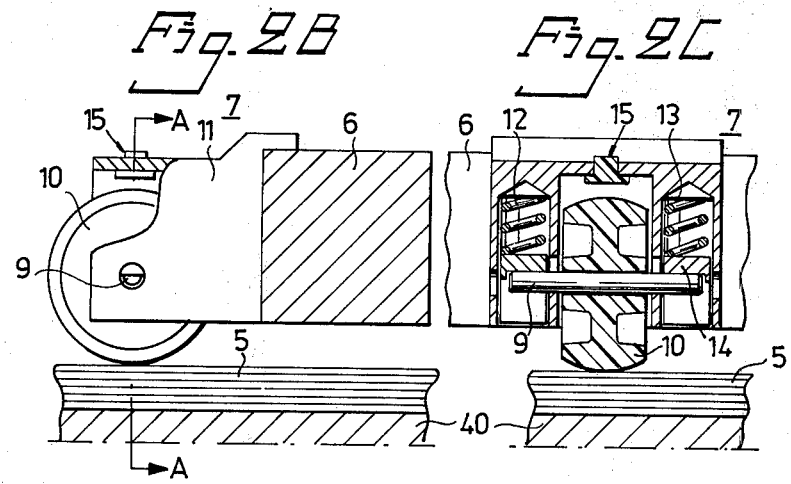
FIG. 2B is a side view at a larger scale of one of the pressure rollers in the machine in FIG. 2A.
FIG. 2C shows a section along the line A—A in FIG. 2B.

In the embodiment of the invention illustrated in FIGS. 2A, 2B, and 2C the pressure exerting means for holding the PC-boards during the drilling or routing process comprises two rigid bars or rods 6 (corresponding to the shafts 1 in FIG. 1), which carry a number of roller assemblies 7 and which extend parallel to each other on opposite sides of the drill spindle 8, which can be moved in the Y-direction parallel to the rods 6, as indicated by an arrow.

As illustrated in FIGS. 2B and 2C, each roller assembly 7 comprises a housing or holder 11, in which a roller 10 on a shaft 9 is mounted for rotation. The ends of the roller shaft 9 are supported in bearing blocks 14, which are movable in vertical directions in the holder 11 and are urged downwards by coil springs 12 compressed between washers 13 and the blocks 14. A plug 15 of friction material, as for instance rubber, is mounted in the roller holder 11 above the roller 10, whereby the roller 10 will be locked against rotation, when the pressure exerted by the roller 10 against the stack 5 of PC-boards is increased to such a value that the springs 12 are compressed and the circumference of the roller 10 is brought in contact with the plug 15.

The rollers 10 are preferably barrel-shaped in order to eliminate any edge disturbances as the board formats differ.

Figure 3:
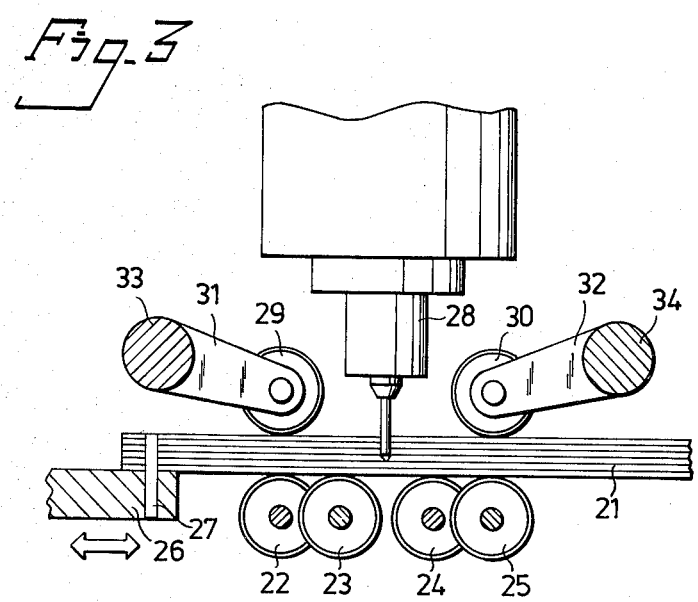
FIG. 3 is a schematic side view similar to FIG. 1 of a drilling machine according to another embodiment of the invention.

FIG. 3 illustrates schematically a drilling machine according to another embodiment of the invention. In this machine the stack 21 of PC-boards to be drilled or routed is not supported on a table but on a number of rotatable support rollers 22, 23, 24, 25 which are arranged with their axes of rotation parallel to the Y-direction in which the drill spindle 28 is movable (the direction perpendicular to the plane of the drawing). The pressure exerting means for keeping the stack 21 of boards together during the drilling process are similar to the pressure exerting means illustrated in FIG. 1, described in the foregoing, and comprises press rollers 29,30 mounted for rotation in the outer ends of arms 31,32 projecting from horizontal, rigid shafts or rods 33,34 which extend parallel to each other on opposite sides of a drill spindle 38 in the Y-direction, in which the drill spindle can be moved.

The stack 21 of PC-cards is attached to a frame 26 by means of pins 27 and can be moved by means of this frame 26 in the X-direction as indicated by an arrow.

Figure 4:
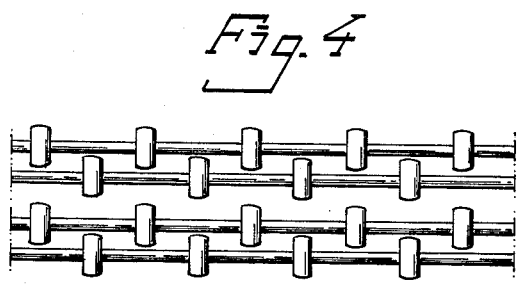
FIGS. 4 and 5 illustrate, by way of example, two arrangements of the support rollers in a machine according to FIG. 3.
Figure 5:
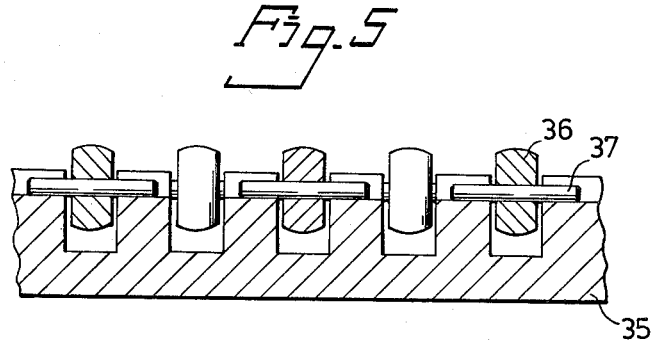

The support rollers 22–25 may be arranged in the manner and pattern illustrated in FIG. 4 or arranged as schematically illustrated in FIG. 5, where the support rollers 36 are individually mounted on shafts 37, which are rotatably supported in grooves in a support plate 35.

The arrangements illustrated in FIGS. 3 to 5 with support rollers instead of a movable support table for the stack of PC-boards to be drilled or routed have the advantage that the mass of the system moving in the X-direction is reduced considerably, whereby the speed of said movement and consequently the production capacity can be increased, a smaller driving power can be used for said movement and the risk for vibration is reduced etc. Further, the drilling and routing can be performed without the use of any back-up boards, as the tool will pass between the support rollers underneath the PC-boards. Also the dust extraction will be facilitated at the routing operation, as the pin router may in this case be made to perform an oscillating movement in the vertical direction, i.e. the Z-direction, during the routing operation.

As illustrated in the drawings, also the support rollers 22 to 25 and 36, respectively, are preferably barrel-shaped in order to eliminate the risk of edge climbing.

The system of support rollers as well as the system of press rollers can be designed in modules and thereby, for the major portion, be moulded, for instance, of plastic material, which provides a high degree of flexibility and low manufacturing costs. Further, it will be appreciated that it is possible, without departing from the concept of the invention, to make the system of support rollers resiliant and the system of press rollers rigid.

I claim:

1. A machine for drilling and routing of printed circuit boards, comprising support means for holding and supporting a stack of superimposed boards in a predetermined support plane and for moving said stack of boards in a first direction parallel to said support plane, a tool spindle disposed above said support plane and being movable in a second direction parallel to said support plane and perpendicular to said first direction independently of said movement of said boards in said first direction, and pressure exerting means for exerting a pressure force upon said boards towards said support means in a direction substantially perpendicular to said support plane, said pressure exerting means comprising at least one roller-shaped pressing member rotatable about an axis parallel to said second direction in which said tool spindle is movable, said support means including a plurality of rollers for supporting said boards, said rollers being arranged with their axes of rotation mutually parallel and parallel to the axis of rotation of said roller-shaped members.

2. A machine as claimed in claim 1, wherein said pressure exerting means includes a plurality of rollers disposed in at least two rows extending on opposite sides of said tool spindle parallel to said second direction in which said tool spindle is movable.

3. A machine as claimed in claim 2, wherein said rollers of the pressure exerting means are barrel-shaped.

4. A machine as claimed in claim 1, wherein said support means further includes a machine table movable in said first direction and provided with a drill plate.

5. A machine as claimed in claim 1, wherein said tool spindle is movable in a third direction perpendicular to said support plane with a substantially continuously oscillating movement.

* * * * *